May 18, 1926.
L. R. HUFF
1,584,860
VOLUME REGULATOR GAUGE
Filed June 26, 1923    2 Sheets-Sheet 1
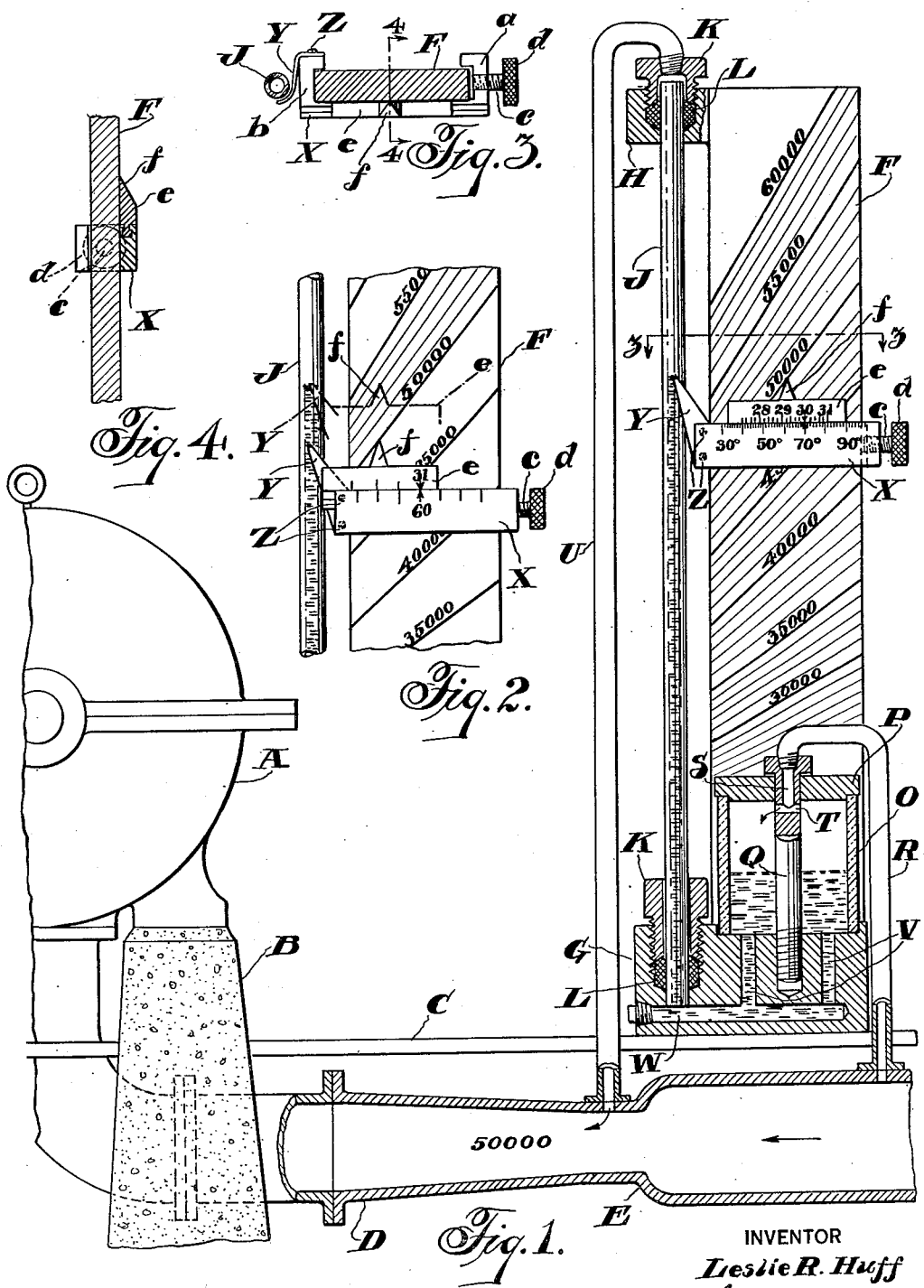
INVENTOR
Leslie R. Huff
BY
Herbert H. Ogden
HIS ATTORNEY May 18, 1926.

L. R. HUFF 1,584,860

VOLUME REGULATOR GAUGE

Filed June 26, 1923    2 Sheets-Sheet 2

INVENTOR
Leslie R. Huff
BY
Herbert S. Ogden
HIS ATTORNEY

Patented May 18, 1926.

1,584,860

UNITED STATES PATENT OFFICE.

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY.

VOLUME-REGULATOR GAUGE.

Application filed June 26, 1923. Serial No. 647,832.

This invention relates to volume regulator gauge for constant volume governing of a turbo blower, turbo compressor or the like.

The objects of the invention are to enable the fluid volume supplied to a turbo blower, turbo compressor or similar machines, to be determined in an improved and simplified manner, by means of a gauge which may be adjusted for different barometric conditions.

Another object of the invention, is to modify and in some respects improve upon the volume regulator gauge described and claimed in my co-pending application, Serial No. 647,831, filed, June 26, 1923.

Further objects will hereinafter appear, and the invention is shown in one of its preferred forms, in the accompany drawings, in which—

Figure 1 is a side elevation partly in vertical section of a volume regulator gauge connected to the intake of a turbo compressor.

Figure 2 is a detail fragmentary view in side elevation of the gauge shown in Figure 1, Figure 3 is a horizontal section taken on the line 3—3 of Figure 1 looking in the direction of the arrows, Figure 4 is an enlarged detail view in vertical section of a portion of the gauge.

Figure 5:
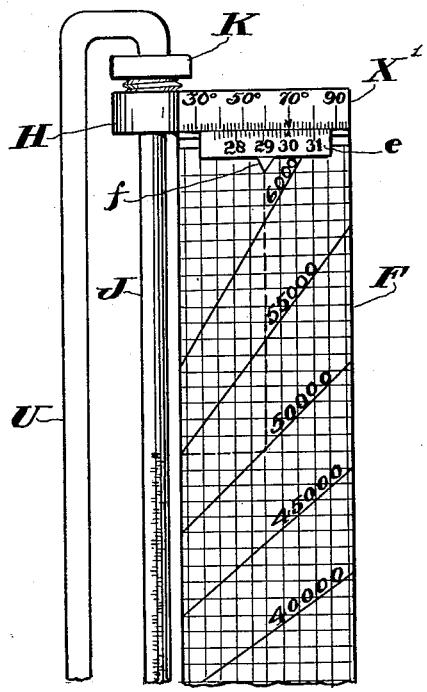
Figures 5 and 6 are side elevations of modified forms of the invention, with the lower portion broken away.

Referring to the drawings, a turbo compressor A is shown mounted in the usual manner on the foundation B, the floor line C being indicated for purposes of illustration. The intake conduit D of the compressor is preferably formed with a restricted portion in the form of a Venturi tube E, in which the velocity of the incoming fluid, such as air, is increased, producing sub-atmospheric pressure, as a Venturi tube has been found to be a convenient device for use in connection with a regulator gauge of the form described.

A main indicating member, preferably in the form of an upright plate F calibrated in fluid volumes under standard conditions of air, is mounted in any suitable manner on the base G and is formed adjacent its upper end with a lateral projection H. A tube J, preferably of glass, has one end mounted in the base G and the other end in the projection H of the main plate F. Upper and lower gland nuts K are adapted to press the packings L securely about the tube J, to hold them firmly in place. A cylinder or reservoir O, in this instance of glass, is mounted on the base G and is provided with a cover P, through which the tap bolt Q extends for holding the cylinder and cover to the base G.

A pipe or tube R connects the tap bolt Q and the intake D, and air from the intake is permitted to pass through the tube R and into and out of the reservoir O through the passage S and port T in the tap bolt Q. The upper end of the tube J is in communication with the restricted portion of the intake D, by means of the tube U. Liquid such as mineral oil or mercury, in the reservoir O is adapted to be drawn up into the tube J through the passages V and W in the base G, due to the difference in pressure in the tubes R and U.

An indicator plate X, having a pointer Y, secured thereto in any suitable manner as by the screw Z, is calibrated in degrees of temperature and is adapted to be moved longitudinally on the plate F, the ends of the plate X being turned inwardly to form channel portions $a$ and $b$ as shown in Figure 3. A set screw $c$ is formed with a knurled head $d$ and is threaded into the channel portion $a$ and is adapted to be tightened against the main plate F for holding the indicator plate X in a desired position of adjustment.

A slide $e$ provided with a pointer $f$ is calibrated in barometric inches and is slidably mounted on the indicator plate X. The slide $e$ may be adjusted relatively to the incator plate X for changes in weather conditions, and the indicator plate X may be moved along the main plate F, so that the pointer $f$ will indicate the fluid volume which is to be supplied to the turbo compressor A. When the pointer $f$ has been set to the desired point, the speed of the compressor will be increased or diminished, according to the indication given by the height of the liquid column in the tube J on the plate F. As shown in Figure 1, the gauge is set for ordinary or "standard" conditions with the temperature at 70° F. and the barometer at 30″.

Figure 6:
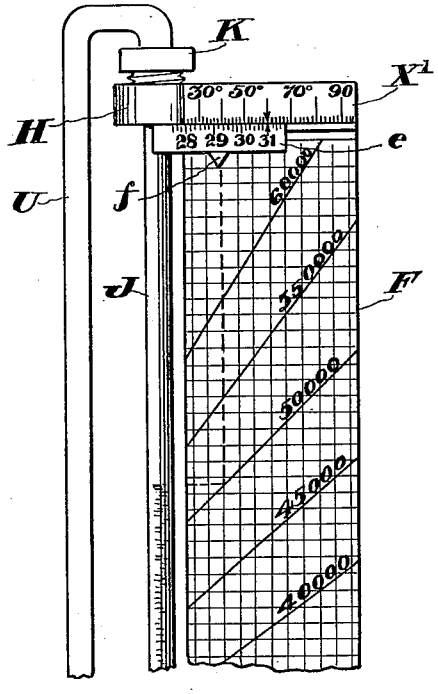

In the modification shown in Figures 5 and 6, the temperature scale X′ is integral with the main plate F, and the slide $e$, which is graduated in barometric inches, is slidable on the main plate F adjacent the indicator plate X′. The main plate F is provided with the series of vertical and horizontal lines to enable correct reading to be made of the gauge. Assume that the weather conditions are 70 degrees temperature and 30" barometer, the slide e will be moved to assume the position shown in Figure 5 in order to determine the fluid volume supplied to the compressor. Assuming that 50,000 cubic feet of fluid per minute is to be supplied to the compressor, the main plate F will be read along the vertical line indicated by the pointer f, to that point where the 50,000 line intersects the vertical line, and then read horizontally to the tube J, to which point the liquid column should rise. In the event, that the liquid column is below this point, the speed of the turbo compressor should be increased, and on the other hand, should the liquid column be above this point, the speed of the machine should be diminished. Figure 6 shows the position the slide e should assume for a temperature of 60° and a barometer of 31".

I claim:

1. A volume regulator gauge for constant volume governing of turbo blowers and compressors, comprising a plate calibrated in fluid volume under standard conditions, an indicator plate calibrated in degrees of temperature mounted slidably on said plate, a slide calibrated in barometric inches mounted on said indicator plate, means associated with the intake of the blower and cooperating with the plate and the slide for determining constancy of fluid volume with respect to immediate atmospheric conditions.

2. A volume regulator gauge for constant volume governing of turbo blowers and compressors, comprising a plate calibrated in fluid volume under standard conditions, an indicator plate calibrated in degrees of temperature slidable longitudinally on said plate, a pointer carried by said indicator plate, a slide calibrated in barometric inches mounted slidably on said indicator plate, means controlled by the intake fluid volume and cooperating with the pointer on the plate for determining constancy of fluid volume with respect to immediate atmospheric conditions.

3. A volume regulator gauge for constant volume governing of turbo blowers and compressors, comprising a plate calibrated in fluid volume under standard conditions, an indicator plate calibrated in degrees of temperature and slidable longitudinally on said plate to compensate for variations in temperature, a pointer on one end of said indicator plate, a slide calibrated in barometric inches to compensate for barometric variations, slidable longitudinally on said indicator plate, a pointer on said slide to indicate fluid volumes on the plate, an upright tube adjacent the plate, and a liquid in said tube controlled by the intake fluid volume of the blower and cooperating with the pointer on the plate for determining constancy of fluid volume with respect to immediate atmospheric conditions.

4. A volume regulator gauge for constant volume governing of turbo blowers and compressors, comprising a plate calibrated in fluid volume under standard conditions, an indicator plate having a pointer at one end and calibrated in degrees of temperature mounted longitudinally slidably on said plate, a slide having a pointer and calibrated in barometric inches to cooperate with the calibrations on the indicator plate for determining the position of the pointers with respect to the plate, a reservoir in communication with the intake of the blower, an upright tube associated with the reservoir, a liquid adapted to flow from the reservoir into the tube controlled by fluid flowing into the blower and cooperating with the pointer on the indicator plate for determining constancy of fluid volume with respect to immediate atmospheric conditions.

In testimony whereof I have signed this specification.

LESLIE R. HUFF.